United States Patent [19]

Sita et al.

[11] Patent Number: 4,561,027

[45] Date of Patent: Dec. 24, 1985

[54] ROTATING D.C. COUPLED RECORD AMPLIFIER FOR DIGITAL MAGNETIC RECORDING

[75] Inventors: Richard K. Sita, Erial; John R. Orr, Pennsauken; John L. Waring, Mt. Laurel, all of N.J.

[73] Assignee: RCA Corporation, Princeton, N.J.

[21] Appl. No.: 477,389

[22] Filed: Mar. 21, 1983

[30] Foreign Application Priority Data

Nov. 29, 1982 [GB] United Kingdom ................. 8233925

[51] Int. Cl.[4] ........................... G11B 5/02; G11B 5/09
[52] U.S. Cl. ....................................... 360/39; 360/46; 360/51
[58] Field of Search ................... 360/39, 46, 68, 36.2, 360/51, 64, 32

[56] References Cited

U.S. PATENT DOCUMENTS

| | | | |
|---|---|---|---|
| 3,016,523 | 1/1962 | Sharp | 360/46 X |
| 3,673,349 | 6/1972 | Berg et al. | 360/64 |
| 3,742,468 | 6/1973 | Lode | 360/39 |
| 3,823,415 | 7/1974 | Fisher et al. | 360/102 |
| 3,846,829 | 11/1974 | Lin | 360/46 |
| 3,987,490 | 10/1976 | Highnote et al. | 360/108 |
| 4,081,756 | 3/1978 | Price | 360/45 X |
| 4,194,223 | 3/1980 | Marino | 360/41 |
| 4,197,565 | 4/1980 | Watanabe | 360/77 |
| 4,385,328 | 5/1983 | Tanaka | 360/46 |
| 4,399,474 | 8/1983 | Coleman, Jr. | 360/46 |
| 4,455,584 | 6/1984 | Heitmann | 360/108 |

OTHER PUBLICATIONS

Two schematic diagram pages of a Cartravision Video Tape Recorder, publically available before 1970. One page is "Figure 12 Video Servo Electronic 3 of 3." The other page is Figure 16 VTR Functional Block Diagram.

RCA Television Tape Recorder TR-800, manufactured by RCA Corporation, Commercial Communications Systems Division, Service Manual, vol. 2, dated Sep. 1981, Scanner Assembly IB-94482, FIGS. 13 and 16.

Primary Examiner—Raymond F. Cardillo, Jr.
Assistant Examiner—Alyssa H. Bowler
Attorney, Agent, or Firm—Eugene M. Whitacre; Paul J. Rasmussen; Joseph J. Laks

[57] ABSTRACT

A magnetic recording system transmits data edge information and clock signals through a rotary transformer. From the signals derived from secondary side of the transformer the data is reconstructed from the edge information and retimed using the clock signals. A record amplifier is D.C. coupled to a recording head for good pulse response. The amplifier can be a differential one with a pulsed current source for still better pulse edge response.

19 Claims, 22 Drawing Figures

ROTATING D.C. COUPLED RECORD AMPLIFIER FOR DIGITAL MAGNETIC RECORDING

BACKGROUND OF THE INVENTION

The present invention relates to digital recording and more particularly, to such recording with improved pulse rise time.

Digital record amplifiers used in helical-scan recording in the prior art as shown in FIG. 1 suffer from several problems. A source of digital information 10 is coupled to a record amplifier 12. The information is shown in FIG. 2A and the output of amplifier 12 in FIG. 2B. A rotating head 16 is coupled to stationary record amplifier 12 through a rotary transformer 14. As shown in FIG. 2C this prior art arrangement suffers from loss of timing integrity, loss of rise-time, and inability to handle data patterns containing large amounts of D.C. such as may be present in NRZ (non-return-to-zero) coding, which coding has the highest tape packing density. These problems become worse on playback due to tape jitter, thereby making bit detection difficult. Since all of these problems stem from the fact that the record amplifier is transformer coupled to the head, the problems can be overcome by eliminating the transformer coupling.

One way of eliminating the transformer coupling is to use slip rings. However such rings wear out, and may, together with their associated brushes, create excessive noise.

It is therefore desirable to have a digital recording system that can record using a code that has a large DC content, minimizes loss of timing integration and rise time, has a minimum of components that wear out and does not create noise.

SUMMARY OF THE INVENTION

Method and apparatus for transmitting through a channel, comprising transmitting data edge information through said channel, transmitting data clock information through said channel, reconstructing said data from the transmitted edge information, and retiming the reconstructed data using the transmitted clock information.

DETAILED DESCRIPTION

Figure 3:
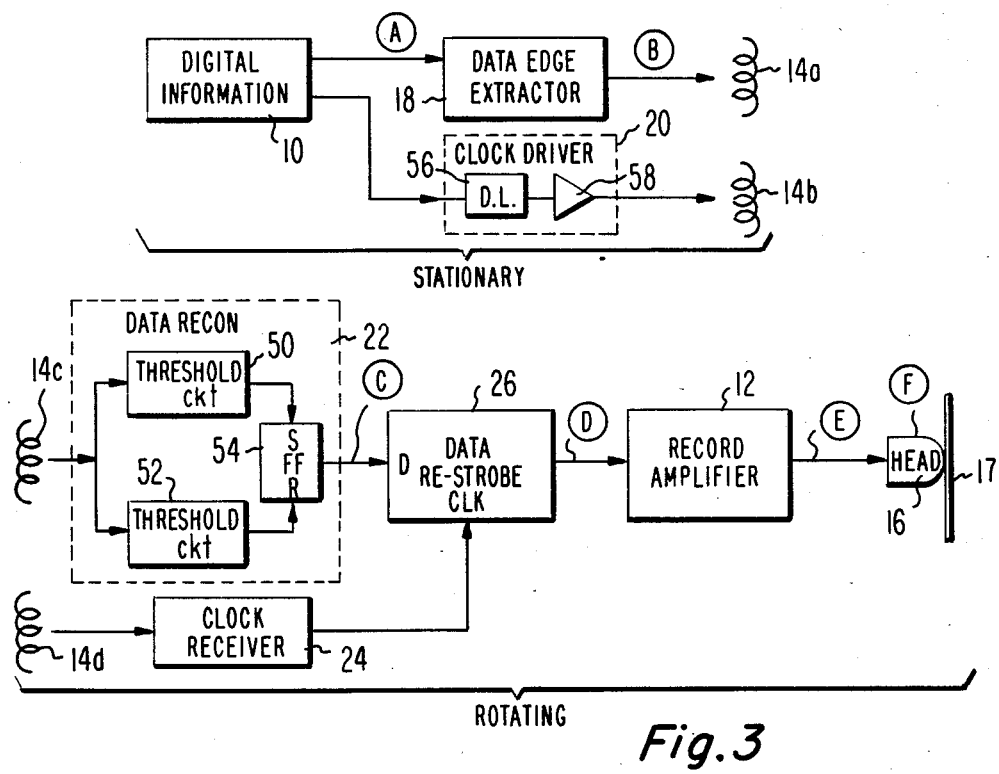
FIG. 3 shows a block diagram of an embodiment of a recording circuit in accordance with the present invention.
Figure 4:
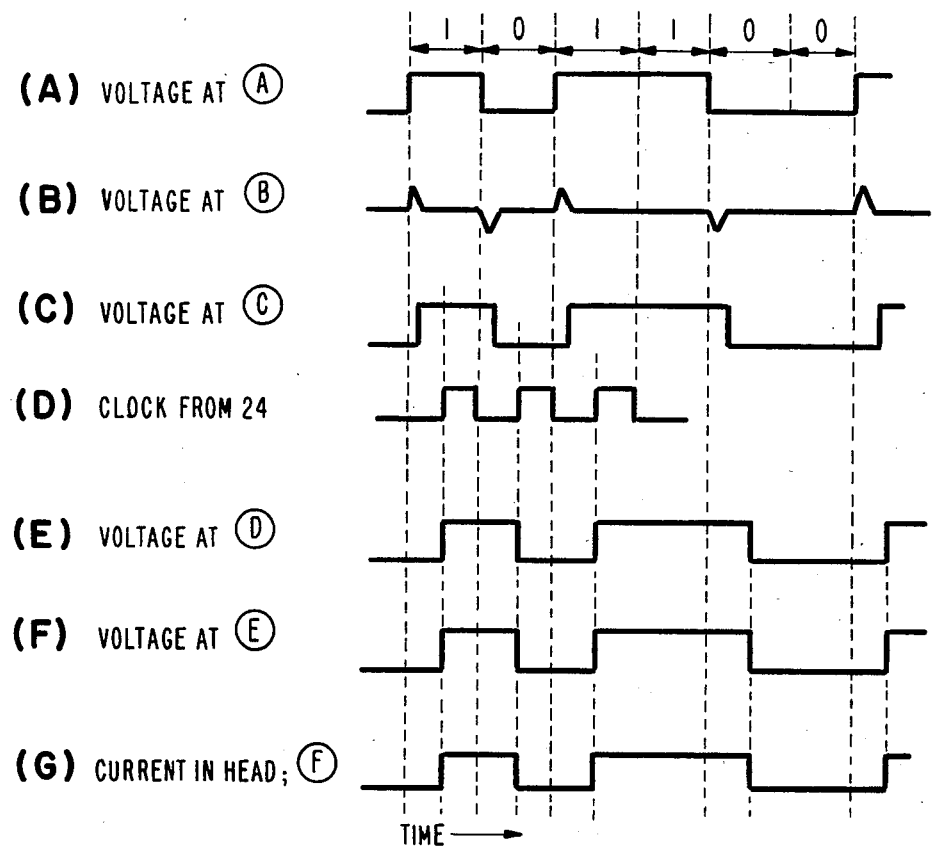
FIGS. 4(A)–4(G) show waveforms present in FIG. 3.

In FIG. 3 digital information source 10 supplies NRZ information pulses (shown in FIG. 4A) to data edge extractor 18, which extractor can comprise a digitally synthesized differentiator, such as delayed and undelayed pulses applied to an exclusive-OR gate. The output waveform from extractor 18 is shown in FIG. 4B and is applied to primary winding 14a of a rotary transformer. Winding 14a is magnetically coupled to secondary winding 14c, which winding 14c supplies a signal to data reconstructor circuit 22. Reconstructor 22 comprises a pair of ECL (emitter coupled logic) threshold circuits 50 and 52, which circuits respectively provide pulses representing positive and negative going edges to the S (set) and R (reset) inputs respectively of an ECL S-R flip-flop 54. The output waveform of flip-flop 54 is shown in FIG. 4C and comprises the output of reconstructor 22.

Source 10 also provides clock pulses for the NRZ information, which pulses have no D.C. content, to clock driver 20, which driver comprises a delay line 56 having a time delay selected to provide best restrobing of the data, and an amplifier 58 having an input coupled to the delay line. In the present embodiment, the delay of line 56 was selected so that the positive going edges of the recovered clock pulses occur at about the middle of the recovered data pulses of FIG. 4C. Driver 20 supplies clock pulses to primary 14b of the rotary transformer. Secondary winding 14d is magnetically coupled to primary 14b and thus receives the clock signal. Since the clock signal has no D.C. content and is of constant frequency (unlike the NRZ information signal), its edges retain their timing when passing through the rotary transformer. The clock pulses are applied to clock receiver 24, which can comprise an ECL amplifier with its input terminated in the characteristic impedance presented by secondary 14d. This termination prevents reflections that may cause timing errors in the recovered clock pulses.

Figure 1:
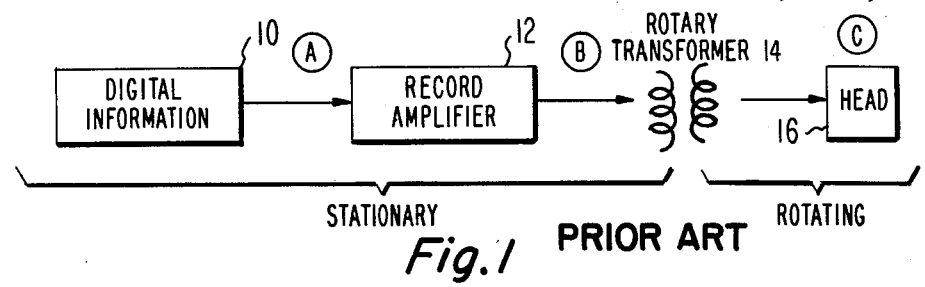
FIG. 1 shows a block diagram of a typical prior art recording circuit.
Figure 2:
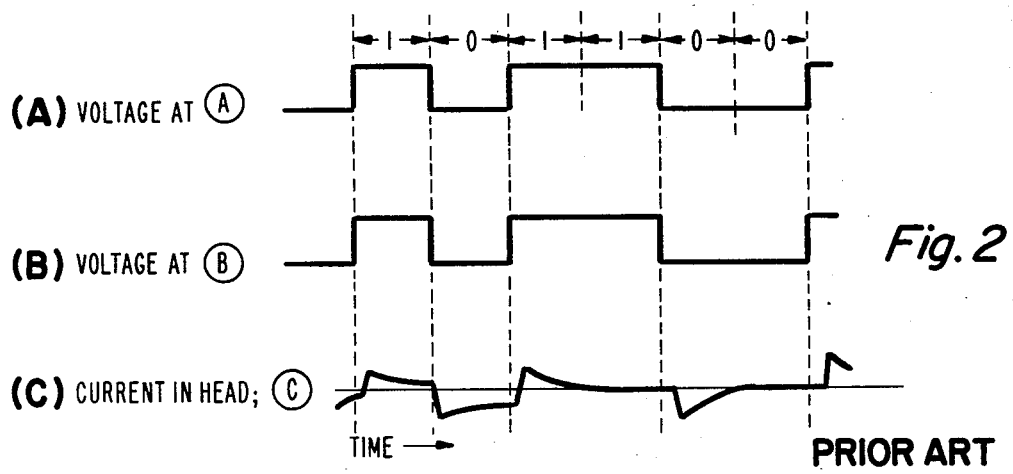
FIGS. 2(A) 2(B) and 2(C) show waveforms present in FIG. 1.

Data restrobe circuit 26 comprises an ECL D-type flip-flop with its clock input receiving the clock pulses from receiver 24 (FIG. 4D) and its D input receiving the signals from reconstructor 22 (FIG. 4C). The output waveform of restrober 26 is shown in FIG. 4E. Although delayed, the edges of said output waveform correspond with an accuracy of about 0.5 ns to that of the original NRZ waveform shown in FIG. 4A. The restrobed signal is applied to record amplifier 12 (described below) having an output waveform shown in FIG. 4F. The output signal from amplifier 12 is then D.C. coupled to head 16 so that there is no loss of rise time due to a rotary transformer, the head current being shown in FIG. 4G. It will be seen that the head current is nearly identical to that of the original information waveform of FIG. 4A even though the original waveform has D.C content, and is appreciably better than that of the prior art head current of FIG. 2C. If amplifier 12 comprises a differential amplifier as described below, then the flip-flop of restrobe circuit 26 supplies signals from both its Q and $\overline{Q}$ outputs to the respective inputs of amplifier 12. Head 16 is in contact with magnetic tape 17. Although shown symbolically, preferably the helical scan configuration is used, as is known in the art.

It is necessary that record amplifier 12 drives head 16 with a sufficient current and a fast rise time. This is made difficult by the fact that head 16 is an inductive load, which does not allow an instantaneous current change to occur, and also by the inherent collector-base capacitance of the amplifier transistor, which also slows down the current change and resonates with the head inductance, which may cause ringing.

Figure 5:
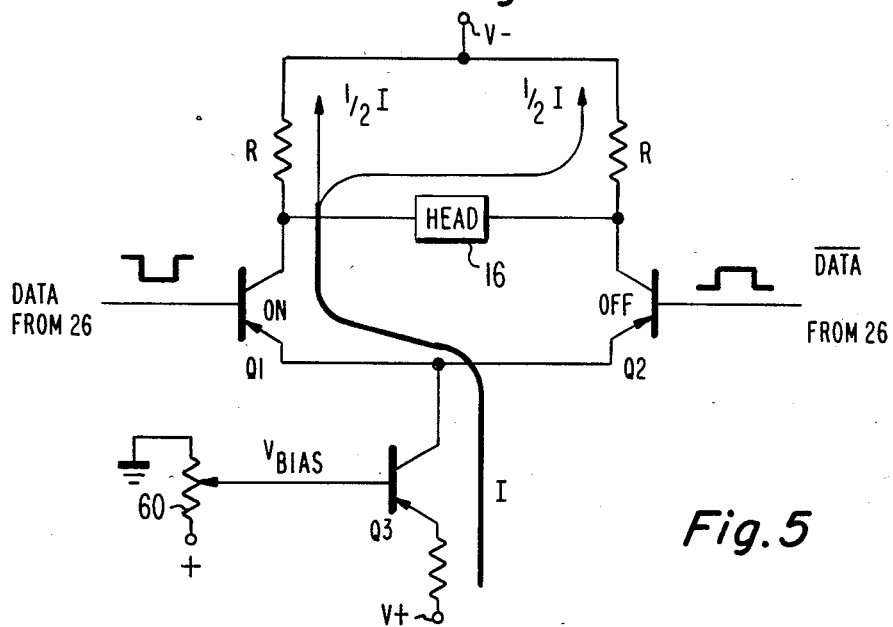
FIG. 5 is a schematic diagram of a record amplifier for use in FIG. 3.

Although there are many configurations for record amplifiers, one preferred configuration is the differential amplifier of FIG. 5. Transistor Q3 is an active current (high impedance) source. By adjusting potentiometer 60, the base-emitter potential, $V_{BIAS}$, is adjusted, whereby the desired current I is selected. Transistors Q1 and Q2 are a matched pair of transistors, to whose base inputs complementary data is applied. Either Q1 or Q2 is ON, but never both. As shown in FIG. 5, transistor Q1 is ON and transistor Q2 is OFF and current flows from transistor Q3 to transistor Q1 and then divides in two, with one-half going through head 16 from left to right. When the data changes state, transistor Q1 is OFF and transistor Q2 is ON and current flows from transistor Q3 to transistor Q2, with one-half going through head 16 from right to left. As the data changes state, transistors Q1 and Q2 are switched accordingly to drive current through head 16 in the appropriate direction. Since the magnitude of the current is constant with only its direction changing, the rise time can be very fast.

The circuit in FIG. 5 has exhibited rise times of 3 ns (10% to 90% amplitude) in a head with inductance of 1 uH at a peak-to-peak head current of 30 mA.

Figure 6:
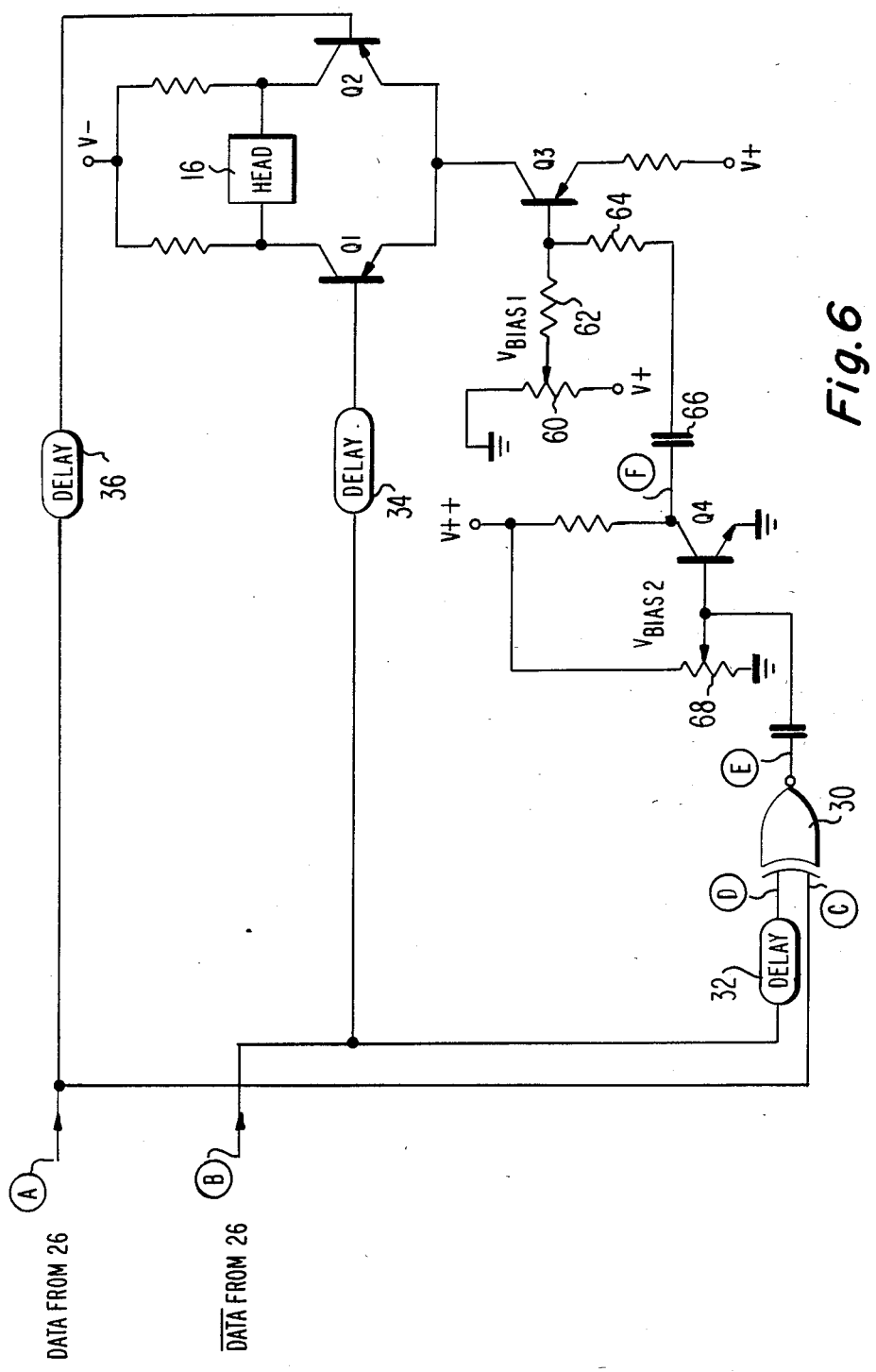
FIG. 6 is a schematic diagram of a circuit incorporating the record amplifier of FIG. 5.
Figure 7:
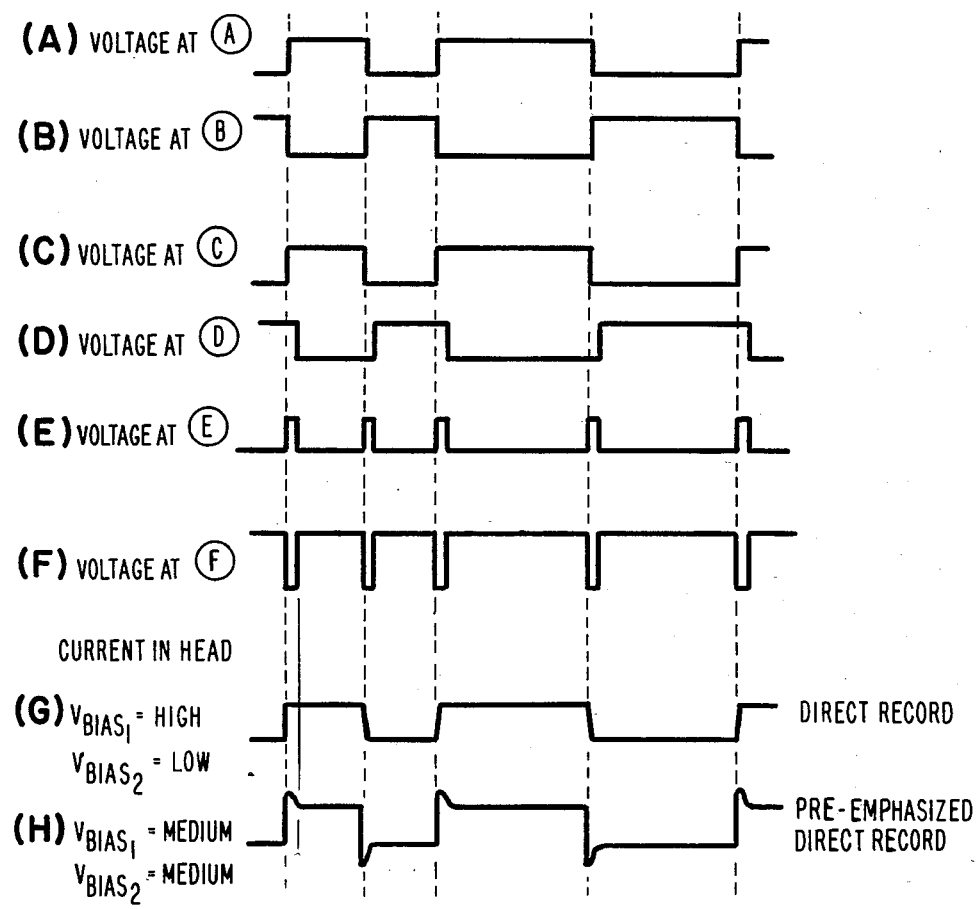
FIGS. 7(A)–7(H) show some waveforms present in FIG. 6.

FIG. 6 shows a modification of FIG. 5, which has a rise time of 2 ns. Complementary data shown in FIGS. 7A and 7B is received from restrobe circuit 26 and is compared in exclusive-NOR gate 30 after one data path has experienced a delay in delay line 32 on the order of 3 ns, see FIGS. 7C and 7D. The output of exclusive-NOR gate 30 comprises positive going pulses of 3 ns width representing the transitions of the data, see FIG. 7E. These pulses are voltage amplified and inverted in transistor Q4, see FIG. 7F. The base-emitter voltage of transistor Q4, $V_{BIAS\,2}$, is determined by potentiometer 68. The pulses are applied to the base of active current source transistor Q3 through capacitor 66 and a resistor addition pad comprising resistors 62 and 64. The addition pad also applied the bias voltage $V_{BIAS\,1}$ to the base of transistor Q3. Current source transistor Q3 responds to the applied pulses by supplying a pulse of current to differential amplifier transistors Q1 and Q2. The data applied to differential pair transistors Q1 and Q2 has experienced a delay in delay lines 34 and 36 exactly equal to the propagation of delay of the circuit at the bottom of FIG. 6 excluding the delay of delay line 32 so that the current pulse from transistor Q3 occurs at the exact time of switching. The pulsed current source transistor Q3 improves the rise time of the head current shown in FIG. 7G, which figure is for the condition of relatively high $V_{BIAS\,1}$ and relatively low $V_{BIAS\,2}$.

In addition to improved rise time, the circuit of FIG. 6 can be used to create an overshoot at the leading edge of the current waveform (known as high-frequency pre-emphasis and shown in FIG. 7H). The height of the overshoot can be adjusted with $V_{BIAS\,2}$ and the amplitude of the normal record current can be adjusted with $V_{BIAS\,1}$. This flexibility is very useful in optimizing the record current waveform and provides means for compensating for different tapes magnetic material compositions having different pulse response times.

The circuit of FIG. 6 has been tested at data rates of 100 Mbits/sec, and record currents of 50 mA peak-to-peak.

Although the invention is most useful for use with codes having a high D.C. content, such as NRZ, it can also be used with any code in order to improve the pulse rise time and timing integrity. DC power is applied to the rotating portion of FIG. 3 using slip rings.

For digital video recorders, the data rate may exceed the capacity of one channel. High data rates may be handled either by dividing the data into multiple channels and coupling the multiple data channels to the rotating portion of the recorder by multiple rotary transformers, each including signal processing as described above. As an alternative, the high data rate information and associated clock information may be coupled to the rotary portion of the recorder by a single pair of transformers, one for the data and one for the clock, and then dividing the high data rate signal into a plurality of lower data-rate signals for application to the heads; in this alternative configuration the signal recovery may be accomplished either once at the high data rate or by a plurality of signal recovery circuits operating at the reduced data rate.

What is claimed is:

1. Apparatus for A.C. transmitting data comprising means for extracting data edge information from said data to produce a data edge signal having an average value that does not vary substantially with the DC content of said data, transformer means having a primary side responsive to said data edge signal for A.C. transmitting said data edge information to the secondary side of said transformer means, means coupled to said transformer means for transmitting data clock information, recovering means coupled to said secondary side for recovering said data from the transmitted edge information, and retiming means for retiming the recovered data using the transmitted clock information.

2. Apparatus as claimed in claim 1 including a magnetic recording head direct current coupled to said recovering means and receiving direct current therefrom for recording the recovered data on a magnetic medium.

3. Apparatus as claimed in claim 1, wherein said extracting means comprises a differentiator.

4. Apparatus as claimed in claim 1, wherein said transmitting means comprises a delay line.

5. Apparatus as claimed in claim 1, wherein said recovering means comprises a pair of threshold circuits coupled to said transformer means for respectively providing signals representative of positive and negative going edges, and a flip-flop having a pair of inputs respectively coupled to said threshold circuits.

6. Apparatus as claimed in claim 1, wherein said retiming means comprises an amplifier coupled to said transformer means, and a restrobe circuit including a D-type flip-flop having a clock input coupled to said amplifier and a D input coupled to said recovering means.

7. Apparatus as claimed in claim 1, further comprising an amplifier coupled to said retiming means and a magnetic recording head D.C. coupled to said amplifier.

8. Apparatus for A.C. transmitting data comprising means for extracting data edge information from said data, transformer means having a primary side coupled to said data edge information extracting means for A.C. transmitting said data edge information to the secondary side of said transformer means, means including a delay line coupled to said transformer means for transmitting data clock information, recovering means coupled to said secondary side for recovering said data from the transmitted edge information, and retiming means for providing recovered clock pulses to retime the recovered data using the transmitted clock information, wherein said delay line has a time delay selected so that a recurring edge of the recovered clock pulses occurs at about the middle of the recovered data.

9. Apparatus for transmitting data through first and second A.C. coupled channels, said apparatus comprising first transmitting means for extracting data edge information from said data and for transmitting the data edge information through said first channel, second transmitting means for transmitting data clock information through said second channel, reconstructing means for reconstructing said data from the transmitted edge information, and retiming means for retiming the reconstructed data using the transmitted clock information, and a differential amplifier having a pair of inputs respectively coupled to a pair of complementary outputs of said retiming means said amplifier also having a pair of complementary outputs D.C. coupled to a magnetic recording head.

10. Apparatus as claimed in claim 9, wherein said differential amplifier further comprises a current source, and means coupled to said retiming means for increasing the current in said current source during the occurrence of said edges.

11. Apparatus comprising a source of data signals and clock signals therefor;
- a differentiator means coupled to said source for receiving said data signals and for providing data edge information;
- a clock driver circuit having a delay line;
- a rotary transformer having first and second primaries respectively coupled to said differentiator means and said clock driver circuit, and first and second secondaries respectively magnetically coupled to said first and second primaries;
- a data reconstructor circuit having a pair of threshold circuits coupled to said first secondary for respectively providing signals representative of positive and negative going edges, and an S-R flip-flop circuit having a pair of inputs respectively coupled to said threshold circuits;
- a data restrobe circuit including a D-type flip-flop having a D input coupled to said S-R flip-flop for receiving reconstructed data, a pair of complementary outputs, and a clock input coupled to said second secondary for receiving clock signals;
- said delay line having a time delay so that the positive-going edges of the clock signal applied to said clock input occur at about the middle of said reconstructed data; and
- a differential recording amplifier having a pair of inputs respectively coupled to said complementary outputs, and a magnetic recording head D.C. coupled to said record amplifier.

12. Apparatus as claimed in claim 11, wherein said differential amplifier further comprises a current source and means coupled to said data restrobe circuit for increasing the current in said current source during the occurrence of said edges.

13. Apparatus for recording a digital signal containing data on a rotary head recording system, comprising:
- means for developing a signal pulse upon the occurrence of a transition in said digital signal and having a narrow pulse duration substantially shorter than the interval between said transition and the next subsequent transition for extracting data edge information;
- transformer means including a stationary primary side coupled to said signal pulse developing means and a rotating secondary side located on a rotating portion of said apparatus;
- means located on said rotating portion and coupled to said secondary side for recovering said data from the extracted data edge information; and
- a recording head located on said rotating portion and responsive to the recovered data for recording said recovered data on a recording medium.

14. Apparatus as claimed in claim 13 including a record amplifier located on said rotating portion and having an input coupled to said data recovering means and having an output direct current coupled to and generating direct current in said recording head.

15. Apparatus as claimed in claim 14 including means for supplying data clock information to said transformer means and means located on said rotating portion and coupled to said data recovering means for retiming the recovered data in accordance with said data clock information.

16. Apparatus for recording digital data on a rotary recording system, comprising:
- data edge means for developing narrow pulses representative of the edges of said data and having an average value that does not vary substantially with the DC content of said data;
- rotary means including a stationary input side coupled to said data edge means and a rotating output side located on a rotating portion of said apparatus for receiving said narrow pulses;
- means located on said rotating portion and coupled to said output side for recovering said data from the received narrow pulses;
- a record amplifier located on said rotating portion and responsive to the recovered data; and
- a recording element located on said rotating portion and coupled to the output of said record amplifier for recording and recovered data on a recording medium.

17. Apparatus as claimed in claim 16 wherein said rotary means AC couples the narrow pulses to said output side.

18. Apparatus as claimed in claim 17 wherein said record amplifier is D.C. coupled to said recording element to generate direct current therein.

19. Apparatus as claimed in claim 18 including means for supplying data clock information to said rotary means and means located on said rotating portion and coupled to said data recovering means for retiming the recovered data in accordance with said data clock information.

* * * * *